Figure 1:
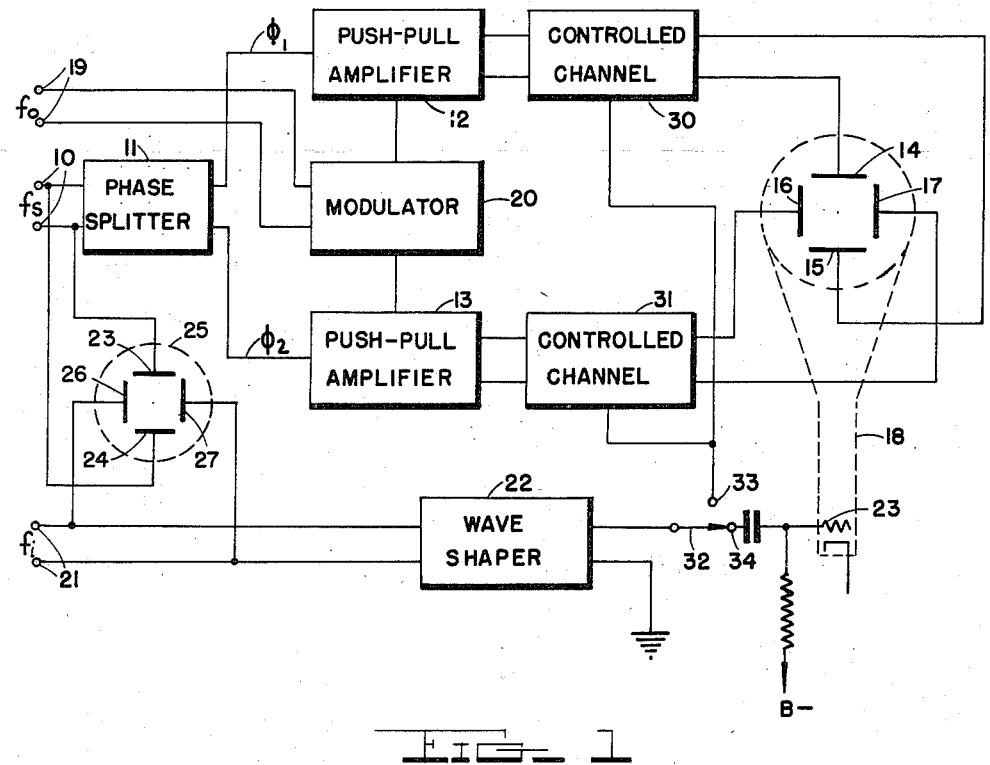

Jan. 9, 1951  A. H. TAYLOR  2,537,104
WAVEMETER
Filed Jan. 22, 1946

6:1

2:1

Inventor
ALBERT H. TAYLOR
By M. O. Hayes
Attorney

Patented Jan. 9, 1951

2,537,104

UNITED STATES PATENT OFFICE 2,537,104

WAVEMETER

Albert H. Taylor, Prince George's County, Md.

Application January 22, 1946, Serial No. 642,779

2 Claims. (Cl. 250—39)

(Granted under the act of March 3, 1883, as amended April 30, 1928; 370 O. G. 757)

This invention relates to a method of accurately calibrating the frequency of electrical oscillators and more particularly to a stroboscopic method of fine, incremental interpolation when calibrating against a fixed frequency standard, together with means therefor.

It is often desirable to calibrate oscillators of both the audio and radio frequency type. This is usually done by using a fixed frequency standard and beating the output of the oscillator under test with the standard frequency or with one of its harmonics. These "harmonic points" are then plotted on a chart of dial reading against frequency and connected by a smooth curve. The interpolated values, i. e. the values between the plotted points, are presumed to lie on the curve. In many types of work it is necessary to have a continuously variable oscillator whose calibration must be very precise for any given frequency. Under the present heterodyne or Lissajous figures method, incremental calibration is impracticable. With the present invention, it is possible, for example, to calibrate an oscillator in ten cycle increments at 50 kilocycles with the same accuracy as the fixed frequency standard. It is theoretically possible to calibrate accurately at any chosen frequency.

An object of the invention is to ascertain accurately the frequency of a signal with reference to a standard frequency.

Another object of the invention is to calibrate an oscillator in smaller increments than are possible using only conventional harmonic means.

Still another object of the invention is to calibrate, to the same accuracy as the standard, an oscillator at any chosen frequency.

Other and further objects and features of this invention will be apparent from the following specification and drawings, showing only an exemplary embodiment of the invention, in which:

Figure I is a block diagram of a preferred embodiment of units used to calibrate an oscillator by the means of the invention.

Figure II is an example of a pattern on a cathode ray tube resulting from a modulated polar sweep, such as might appear on tube 18 of Fig. I.

Figure III is a familiar Lissajous figure, as might appear on the cathode ray tube 25 of Figure I.

Referring now to Figure I in detail, the arrangement of the component parts shown, was designed to provide calibration from the low audio frequencies to the medium-high radio frequencies using a reference frequency in the medium audio range as a standard. The standard voltage of frequency $f_s$ is connected at terminals 10 to the phase splitter circuit 11. Phase one $\phi_1$ is connected from the output of phase splitter 11 to push-pull amplifier 12 and phase two $\phi_2$ from phase splitter 11 to push-pull amplifier 13. The push-pull output of amplifiers 12 and 13 are fed to opposite pairs of deflection plates 14, 15 and 16, 17 respectively of cathode ray tube 18 through controlled channels 30 and 31.

The signal of unknown frequency $f_0$, such as might be obtained from an oscillator to be calibrated, is connected at terminals 19 to modulator 20. The output voltage of modulator 20 is fed to amplifiers 12 and 13.

A low-frequency, continuously variable calibrated oscillator, connected at terminals 21, supplies a voltage of frequency $f_1$ to wave shaper circuit 22 and to a pair of deflection plates 26, 27 of an auxiliary cathode ray tube 25. The other pair of deflection plates 23, 24 of tube 25 are connected at terminals 10 to the standard frequency voltage $f_s$. The output of the wave shaper 22, a series of short pulses at a repetition rate $f_1$, is connected to switch arm 32 where it may be fed by choice through contact 33 to the controlled channels 30 and 31, or through contact 34 where it is capacitatively coupled to control grid 23 of cathode ray tube 18.

The phase splitter 11 and push-pull amplifiers 12 and 13 are used to produce a polar sweep of the electron beam in cathode ray tube 18, at the frequency of the standard voltage $f_s$. The phase splitter 11 may be a simple resistance-capacitance network capable of producing approximately equal voltages in phase quadrature. The push-pull amplifiers 12 and 13 should be identical so as to produce equal push-pull voltages on opposite pairs of deflecting plates in the cathode ray tube 18. If the above conditions have been met, and the voltage of phase one is equal in magnitude to the voltage of phase two but 90° out of phase, the pattern described on the face of the scope will be a circle. Unequal voltages at phases differing from 90° will produce an eliptical pattern which is usable but not as readable. The voltage whose frequency is to be determined, $f_0$, is connected at terminals 19 to modulator 20, the output of which is used to modulate push-pull amplifiers 12 and 13 in parallel. This effective modulation of the polar sweep produces a serrated or gear-wheel pattern on the face of cathode ray tube 18.

If K is the actual ratio of the oscillator or modulation frequency to the standard or polar frequency, then K cycles will be described on the cathode ray tube in one revolution of the polar sweep. It is easily seen that if K is an exact integer, the gear-wheel patter will appear stationary. If K is not an integer ratio, then this pattern will appear to rotate. Now if N equals the integer ratio which is nearest the ratio $$K = \frac{f_0}{f_s}$$

and if the polar sweep is rotating clockwise, then the pattern will rotate counterclockwise when K is greater than N and clockwise when K is less than N. If then, the image producing beam were to be interrupted at a frequency equal to the rate at which the pattern slipped back or advanced forward one cycle, a stationary pattern would be observed on the screen, due to the stroboscopic effect, and by measuring the interrupting frequency, it would be possible to use this information to interpolate between integer ratios N and thus obtain the exact value of K.

The function of the voltage from wave shaper 22 applied through terminal 34 to control grid 23, or through terminal 33 to controlled channels 30 and 31 is then to provide means for accomplishing the desired beam interruption. Alternate methods have been shown in Figure 1 to illustrate two fundamental forms that the invention may assume in effecting the desired interruption. Either method may be selected by means of switch arm 32. It is to be clearly understood, however, that only one form is necessary in an actual embodiment. Likewise, it is to be understood that applying a suitable voltage on any of the tube elements so as to accomplish interruption or displacement of the beam from the fluorescent tube face, is included in the scope and spirit of this invention. The preferred of the aforementioned methods, that of producing a gating pulse on the grid of tube 18, will be described first.

A frequency $f_1$ is applied at terminals 21 to wave shaper 22 where it is transformed into a series of pulses having a repetition rate equal to $f_1$. If the frequency $f_1$ be so adjusted that the beam in cathode ray tube 18 is turned on every time a given point on the displayed pattern has slipped back or advanced forward exactly one cycle, the same pattern which was observed at the exact harmonic ratio, will again appear to be stationary. The unknown frequency $f_0$ will be equal to the number of complete stationary cycles described by the polar trace in sweep cycle times the polar sweep frequency plus or minus the interruption frequency depending on which way the pattern is rotating. The above statement can be expressed in a formula as follows:

$$f_0 = N(f_s) \pm f_1$$

There are several stroboscopic frequencies which will freeze the motion of the gear-wheel pattern on the face of the tube. For example, if K were greater than N, and the tube were illuminated each time a given point on the pattern had slipped backward two complete cycles, a similar stationary pattern would appear on the scope. There would be M numbers of these false indications and they could be expressed in the following formula:

$$f_{i_M} = \frac{f_i}{M}$$

where M is the number of complete cycles of lag or lead per illumination period, and $f_{iM}$ is the frequency at which a stationary pattern would occur under those conditions. This effect can be overcome, however, by choosing the highest interpolation frequency at which the gear-wheel pattern will appear stationary.

Figure 2:
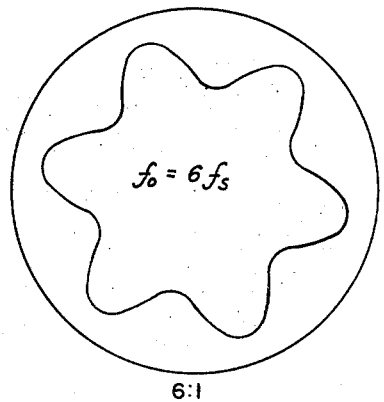
Figure 3:
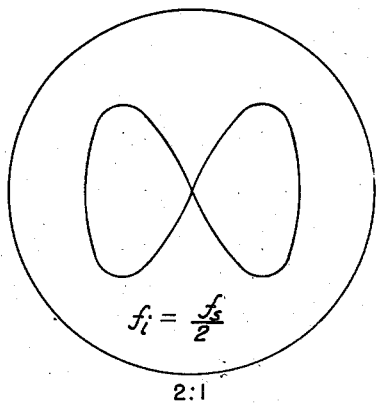

Figure 2 shows an example of the type of indication that would appear on cathode ray tube 18 when ratio N was equal to 6. The frequency of the interrupting voltage can be accurately determined by applying voltage $f_1$ at terminals 21 to deflecting plates 26 and 27 of the auxiliary cathode ray tube 25, as shown in Figure 1. The other pair of plates 23 and 24 of cathode ray tube 25 are connected to the standard frequency $f_s$ at terminals 19. The pattern on tube 25 would be a Lissajous figure, an example of which is shown in Figure 3, and would accurately ascertain the frequency of $f_1$ with respect to the standard frequency in a manner which is well known to the art.

An alternate method for interrupting the pattern on the screen of tube 18, shown in Figure 1, is to gate the deflecting voltage. This is done by switching switch arm 32 to contact 33 and applying the gating voltage to controlled channel 30 and 31, which may consist of electronic switching means such as an amplifier tube, to one grid of which the signal is applied and to another grid of which the gating voltage is applied.

The nature of wave shaper 22 will depend upon the desired frequency range and flexibility of the calibrator. For example, a simple sine wave may be used in certain cases to gate the grid 23 whereas in others, a short differentiated pulse might be necessary in order to obtain clear definition of the pattern. In general, it would be desirable to have the "on" gating pulse width about one-tenth the period of the interrupting frequency. The interruption frequency source should be variable and have a range from zero to $f_s$.

The polar pattern is very advantageous since very high ratios of frequency can be read, especially if a large-diameter cathode ray tube is used. It is also possible that the functions of tube 25 could be taken over by tube 18 by installing a switching mechanism, or that tube 25 could be eliminated altogether, since an error in the low-frequency voltage, $f_1$, would be a very small percentage of the oscillator frequency, $f_0$.

While only two methods of producing a stroboscopic effect have been shown in the embodiment described, it is to be clearly understood any method of interrupting the cathode beam in the cathode ray tube 18 so as to produce a stroboscopic effect on the screen of said tube, is included in the scope and spirit of this invention.

The invention described herein may be manufactured and used by or for the Government of the United States of America for governmental purposes without the payment of any royalties thereon or therefor.

What is claimed is:

1. A frequency measuring device comprising in combination an input channel for receiving a signal of unknown frequency, an indicating cathode ray tube, an input channel for receiving a known frequency, a phase splitter circuit operative to divide the known frequency into two substantially equal voltages of the known frequency and one being substantially in phase quadrature with the other, amplifier means separately responsive to each of said phases from said phase splitter and operative to supply a push-pull voltage of one of said phase to one pair of deflection plates of said cathode ray tube and the other of said phase to the other pair of deflection plates of said cathode ray tube so as to establish a closed sweep locus which is recurrently retraced at the known frequency, modulator means by which the aforementioned closed sweep locus may be deflection modulated responsive to the unknown signal, and means for recurrently interrupting the electron beam in the cathode ray tube at a second known frequency.

2. A frequency measuring device comprising in combination an input channel for receiving a signal of unknown frequency, an indicating cathode ray tube, an input channel for receiving a known frequency, a phase splitter circuit operative to divide the known frequency into two substantially equal voltages of the known frequency and one being substantially in phase quadrature with the other, amplifier means separately responsive to each of said phases from said phase splitter and operative to supply a push-pull voltage of one of said phase to one pair of deflection plates of said cathode ray tube and the other of said phase to the other pair of deflection plates of said cathode ray tube so as to establish a closed sweep locus which is recurrently retraced at the known frequency, modulator means by which the aforementioned closed sweep locus may be deflection modulated responsive to the unknown signal, means for recurrently interrupting the electron beam in the cathode ray tube at a known frequency, and a secondary cathode ray tube indicating means for comparing the interrupting frequency to the said known frequency.

ALBERT H. TAYLOR.

REFERENCES CITED

The following references are of record in the file of this patent:

UNITED STATES PATENTS

| Number | Name | Date |
|---|---|---|
| 2,121,359 | Luck et al. | June 21, 1938 |
| 2,178,074 | Jakel | Oct. 31, 1939 |
| 2,206,637 | Koch | July 2, 1940 |
| 2,233,275 | Wolff | Feb. 25, 1941 |
| 2,283,616 | Slonczewski | May 19, 1942 |
| 2,407,475 | Charrier | Sept. 10, 1946 |
| 2,426,721 | Adams | Sept. 2, 1947 |